US012597619B2

(12) United States Patent (10) Patent No.: US 12,597,619 B2

Inoue et al. (45) Date of Patent: Apr. 7, 2026

(54) FUEL CELL SYSTEM

(71) Applicant: HONDA MOTOR CO., LTD., Tokyo (JP)

(72) Inventors: Tomoyuki Inoue, Wako (JP); Yuto Nakatani, Wako (JP); Ryoji Sakai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 555 days.

(21) Appl. No.: 18/104,413

(22) Filed: Feb. 1, 2023

(65) Prior Publication Data

US 2023/0253586 A1     Aug. 10, 2023

(30) Foreign Application Priority Data

Feb. 7, 2022     (JP) ................................. 2022-016843

(51) Int. Cl.
| | |
|---|---|
| *H01M 8/04* | (2016.01) |
| *H01M 8/04089* | (2016.01) |
| *H01M 8/04225* | (2016.01) |
| *H01M 8/04313* | (2016.01) |
| *H01M 8/04746* | (2016.01) |
| *H01M 8/10* | (2016.01) |

(52) U.S. Cl.
CPC ... *H01M 8/04746* (2013.01); *H01M 8/04089* (2013.01); *H01M 8/04225* (2016.02); *H01M 8/04313* (2013.01); *H01M 2008/1095* (2013.01)

(58) Field of Classification Search
CPC ......... H01M 8/04746; H01M 8/04225; H01M 8/04089; H01M 8/04313; H01M 2008/1095

USPC ........................................................ 429/429
See application file for complete search history.

(56) References Cited

U.S. PATENT DOCUMENTS

| | | | |
|---|---|---|---|
| 2016/0380286 A1 | 12/2016 | Yamanaka et al. | |
| 2016/0380287 A1* | 12/2016 | Kaneko | H01M 8/0494 |
| | | | 429/429 |
| 2019/0140290 A1* | 5/2019 | Namba | H01M 8/2465 |
| 2020/0072374 A1* | 3/2020 | Hagiwara | H02P 13/00 |

(Continued)

FOREIGN PATENT DOCUMENTS

| | | |
|---|---|---|
| CN | 113690462 A | 11/2021 |
| CN | 113851677 A | 12/2021 |
| JP | H07-293355 A | 11/1995 |

(Continued)

OTHER PUBLICATIONS

Office Action dated Oct. 31, 2023 issued in the corresponding Japanese Patent Application No. 2022-016843 with the English machine translation thereof.

(Continued)

*Primary Examiner* — James M Erwin
(74) *Attorney, Agent, or Firm* — Carrier, Shende & Associates P.C.; Joseph P. Carrier; Fulchand P. Shende

(57) ABSTRACT

A fuel cell system executes a first valve drive operation by causing a power supply unit to output the first voltage to drive an electric-operated valve to open at a time of starting power generation by a fuel cell stack, and executes a second valve drive operation by causing the power supply unit to output the second voltage to drive the electric-operated valve to open in a case where the electric-operated valve is in a closed state even after execution of the first valve drive operation.

4 Claims, 4 Drawing Sheets

(56)          References Cited

U.S. PATENT DOCUMENTS

2021/0367255  A1    11/2021  Kim
2021/0408564  A1    12/2021  Ikeda

FOREIGN PATENT DOCUMENTS

| JP | H08-247323  A | 9/1996 |
| JP | 2004-278307  A | 10/2004 |
| JP | 2005-268051  A | 9/2005 |
| JP | 2005-285686  A | 10/2005 |
| JP | 2006-038182  A | 2/2006 |
| JP | 2008-077959  A | 4/2008 |
| JP | 2013-125626  A | 6/2013 |
| JP | 2017-016741  A | 1/2017 |

OTHER PUBLICATIONS

Office Action and Search Report dated Jan. 5, 2026 issued in the corresponding Chinese Patent Application No. 202310086776.9 with the English machine translation thereof.

* cited by examiner

FUEL CELL SYSTEM

CROSS-REFERENCE TO RELATED APPLICATIONS

This application is based upon and claims the benefit of priority from Japanese Patent Application No. 2022-016843 filed on Feb. 7, 2022, the contents of which are incorporated herein by reference.

BACKGROUND OF THE INVENTION

Field of the Invention

The present invention relates to a fuel cell system to be mounted on a moving object or the like.

Description of the Related Art

In recent years, fuel cells have attracted attention in various fields. For example, there is a fuel cell vehicle equipped with fuel cells. A fuel cell vehicle is powered by an electric motor running on electricity generated by electrochemical reactions in the fuel cells. For this reason, there is no discharge of $CO_2$, $NO_x$, $SO_x$ and the like as in gasoline-powered vehicles, but only water is discharged, and therefore fuel cell vehicles are environmentally friendly. The fuel cell may be mounted on other moving objects such as ships, aircrafts, robots and so on, in addition to automobiles.

Various valves are used in a fuel cell system for causing fuel cells to generate electric power. When the fuel cell system is used in a cold district or the like, there is a possibility that the valves are stuck in an open state due to freezing. JP 2017-016741 A discloses a method of loosening a frozen valve by alternately generating in the valve a torque in a direction of increasing an opening degree of the valve and a torque in a direction of decreasing the opening degree of the valve.

SUMMARY OF THE INVENTION

However, in the case of deep-frozen valves, there is a possibility that the valves cannot be released from the frozen state by the method of JP 2017-016741 A. In this case, it is considered that the frozen state can be released by applying a stronger torque to the valve.

When a stronger torque is applied to the valve, it is necessary to increase the valve drive voltage. For this reason, there is a concern that deterioration of a power supply is accelerated. Therefore, it is required to release valves from a frozen state while suppressing acceleration of deterioration of the power supply.

An object of the present invention is to solve the aforementioned problem.

An aspect of the present embodiment for achieving the aforementioned object is to provide a fuel cell system comprising: a fuel cell stack configured to generate electric power by electrochemical reactions between a fuel gas and an oxygen-containing gas; an oxygen-containing gas supply flow path configured to supply the oxygen-containing gas to the fuel cell stack; an electric-operated valve disposed on the oxygen-containing gas supply flow path; a power supply unit configured to output, to the electric-operated valve, one of a first voltage and a second voltage higher than the first voltage; a sensor configured to detect an open or closed state of the electric-operated valve; and a controller configured to control the power supply unit, wherein the controller executes a first valve drive operation by causing the power supply unit to output the first voltage to drive the electric-operated valve to open at a time of starting power generation by the fuel cell stack, and executes a second valve drive operation by causing the power supply unit to output the second voltage to drive the electric-operated valve to open in a case where the electric-operated valve is in a closed state even after execution of the first valve drive operation.

According to the aspect of the present invention, it is possible to suppress acceleration of degradation of the power supply unit and to reduce power consumption by the electric-operated valve as compared to the case where the first valve drive operation is not performed. Further, by performing the second valve drive operation, even if the electric-operated valve is in a relatively deep frozen state, it is possible to release the frozen state. As a result, the frozen state can be released while suppressing acceleration of degradation of the power supply.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a schematic diagram showing a configuration of a fuel cell system according to an embodiment;

FIG. 2 is a block diagram showing a configuration of a part of the fuel cell system;

DETAILED DESCRIPTION OF THE INVENTION

Figure 1:
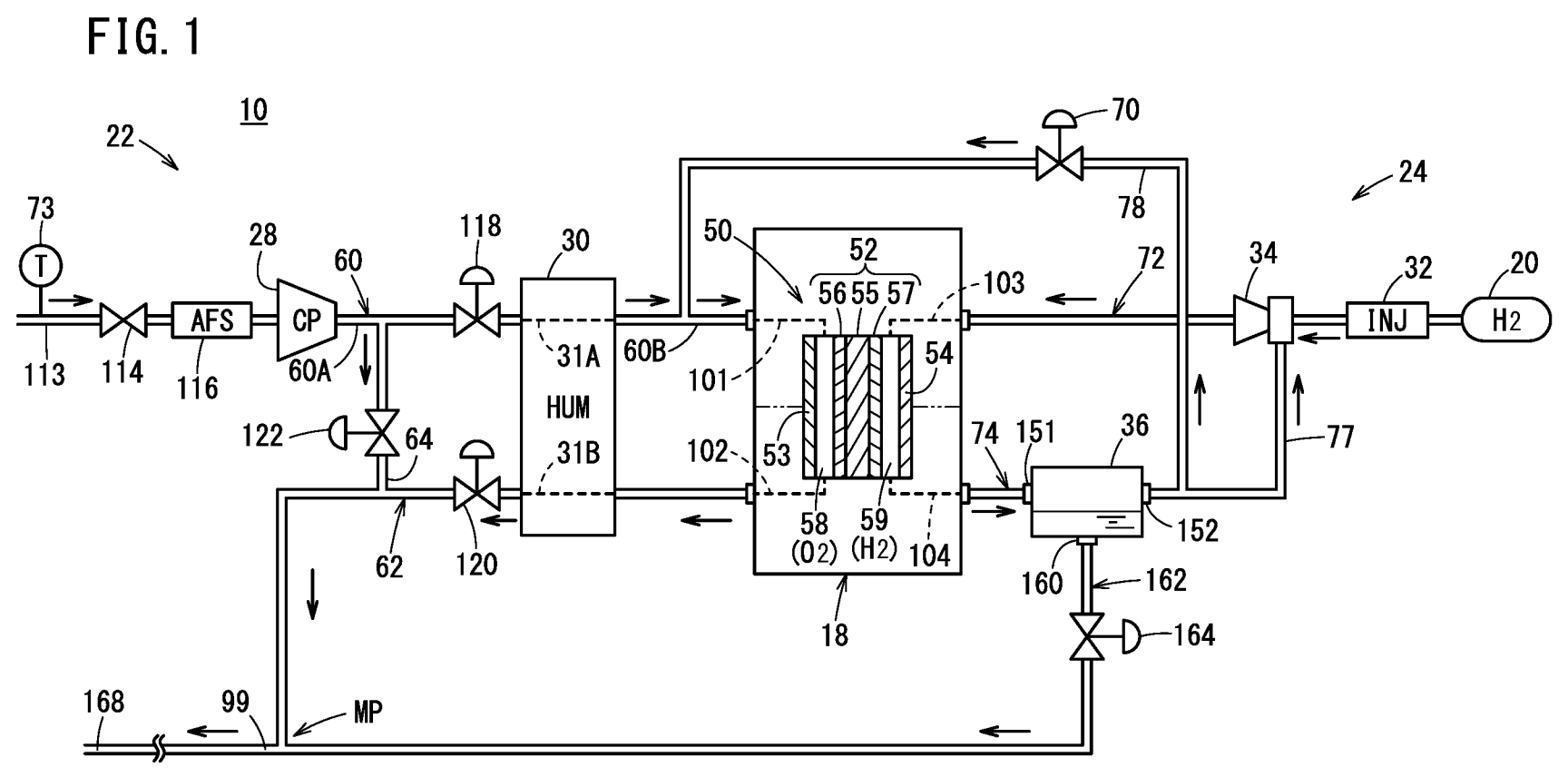
Figure 3:
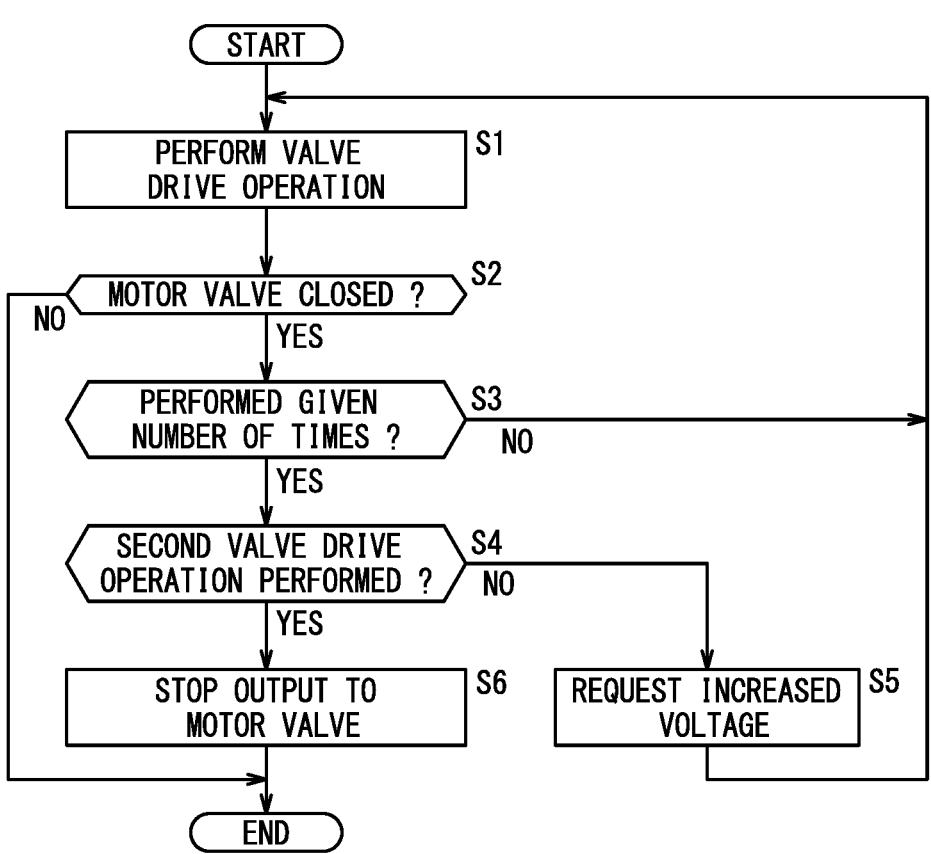
FIG. 3 is a flowchart showing a procedure of valve control processing.

FIG. 1 is a schematic diagram showing a configuration of a fuel cell system 10 according to an embodiment. The fuel cell system 10 includes a fuel cell stack (also simply referred to as a fuel cell) 18, a hydrogen tank 20, an oxygen-containing gas supply device 22, and a fuel gas supply device 24.

A fuel cell stack 18 generates electric power through electrochemical reactions between a fuel gas and an oxygen-containing gas. Examples of the fuel gas include hydrogen gas. Examples of the oxygen-containing gas include air containing oxygen gas.

In the fuel cell stack 18, a plurality of power generation cells 50 are stacked. Each of the power generation cells 50 includes a membrane electrode assembly 52, and a pair of separators 53, 54 that sandwich the membrane electrode assembly 52.

Each of the membrane electrode assemblies 52, for example, is equipped with a solid polymer electrolyte membrane 55 in which a thin film of perfluorosulfonic acid is impregnated with water, and a cathode 56 and an anode 57 sandwiching the solid polymer electrolyte membrane 55.

Each of the cathode 56 and the anode 57 has a gas diffusion layer (not shown) made from carbon paper or the like. An electrode catalyst layer (not shown) of a platinum alloy supported on porous carbon particles is coated uniformly on the surface of the gas diffusion layer. The electrode catalyst layer is formed on both surfaces of the solid polymer electrolyte membrane 55, respectively.

On the side of the one separator 53 that faces the membrane electrode assembly 52, a cathode side flow field (an oxygen-containing gas flow field) 58 is formed to communicate with an oxygen-containing gas supply passage 101 and an oxygen-containing gas discharge passage 102.

On the side of the other separator 54 that faces the membrane electrode assembly 52, an anode side flow field (a fuel gas flow field) 59 is formed to communicate with the fuel gas supply passage 103 and fuel gas discharge passage 104.

In the anode 57, by the fuel gas (hydrogen) being supplied, hydrogen ions are generated from hydrogen molecules by electrode reactions caused by catalyst, and the hydrogen ions pass through the solid polymer electrolyte membrane 55 and then move to the cathode 56, while electrons are released from hydrogen molecules. The electrons released from hydrogen molecules move to the cathode 56 through the positive terminal.

At the cathode 56, by action of the catalyst, the hydrogen ions and the electrons, and oxygen contained in the supplied oxygen-containing gas are reacted to produce water.

The oxygen-containing gas supply device 22 supplies the oxygen-containing gas to the fuel cell stack 18. The oxygen-containing gas supply device 22 includes a compressor (CP) 28 and a humidifier (HUM) 30.

The compressor 28 is constituted by a mechanical supercharger or the like, and has functions such as sucking outside air (atmosphere, air) from an outside air intake hole 113, pressurizing it, and supplying it to the fuel cell stack 18 through the humidifier 30, and the like.

The humidifier 30 has a flow path 31A and a flow path 31B. Air (oxygen-containing gas) compressed, heated to a high temperature and dried by the compressor 28 flows through the flow path 31A. The exhaust gas discharged from the oxygen-containing gas discharge passage 102 of the fuel-cell stack 18 flows through the flow path 31B.

Here, while the bleed valve 70 is closed, the exhaust gas is a wet oxygen-containing off-gas (wet cathode off-gas, wet oxygen-containing exhaust gas), whereas while the bleed valve 70 is opened, the exhaust gas is a wet exhaust gas (off-gas) as a mixture of the wet oxygen-containing off-gas and a fuel off-gas (anode off-gas, fuel exhaust gas).

The humidifier 30 has a function of humidifying the oxygen-containing gas supplied from the compressor 28. That is, the humidifier 30 transfers moisture contained in the exhaust gas (off-gas) flowing through the flow path 31B to a supply gas (oxygen-containing gas) flowing through the flow path 31A via an internally provided porous membrane to supply a humidified oxygen-containing gas to the fuel cell stack 18.

A shut-off valve 114, an air flow sensor (AFS: flow rate sensor) 116, the compressor 28, a supply-side stop valve 118, and the humidifier 30 are provided on the oxygen-containing gas supply flow path 60 (including oxygen-containing gas supply flow paths 60A, 60B) extending from the outside air intake hole 113 to the oxygen-containing gas supply passage 101 in order from the outside air intake hole 113. The flow paths such as the oxygen-containing gas supply flow path 60 drawn by double lines are formed by pipes (the same applies to the following description).

The shut-off valve 114 is opened to allow and close to shut off intake of the air into the oxygen-containing gas supply flow path 60.

The air flow sensor 116 measures the flow rate of the oxygen-containing gas supplied to the fuel cell stack 18 through the compressor 28.

The supply-side stop valve 118 opens and closes the oxygen-containing gas supply flow path 60A.

The outside air intake hole 113 is provided with a temperature sensor 73 that detects (measures) an outside air temperature.

The humidifier 30 and a discharge-side stop valve 120 that also functions as a back pressure valve are disposed on the oxygen-containing gas discharge flow path 62 in communication with the oxygen-containing gas discharge passage 102 in this order from the oxygen-containing gas discharge passage 102.

A bypass channel 64 is provided between a suction inlet of the supply-side stop valve 118 and a discharge outlet of the discharge-side stop valve 120 to allow the oxygen-containing gas supply flow path 60 and the oxygen-containing gas discharge flow path 62 to communicate with each other. The bypass channel 64 is connected to the oxygen-containing gas supply flow path 60 and the oxygen-containing gas discharge flow path 62 to bypass the fuel cell stack 18. The bypass channel 64 is provided with a bypass valve 122 that opens and closes the bypass channel 64. The bypass valve 122 adjusts the flow rate of the oxygen-containing gas bypassing the fuel cell stack 18.

The hydrogen tank 20 is a container including a solenoid shut-off valve, and compresses highly pure hydrogen under high pressure, and stores the compressed hydrogen. The fuel gas supply device 24 supplies the fuel gas supplied from the hydrogen tank 20 to the fuel cell stack 18. The fuel gas supply device 24 includes an injector (INJ) 32, an ejector 34, and a gas-liquid separator 36. The injector 32 may be replaced with a pressure reducing valve.

The fuel gas discharged from the hydrogen tank 20 flows through the injector 32 and the ejector 34 that are disposed on a fuel supply flow path 72, and is then supplied to an inlet of the anode flow field 59 of the fuel cell stack 18 through a fuel gas supply passage 103.

An outlet of the anode flow field 59 is connected to a gas supply hole 151 of the gas liquid separator 36 through a fuel gas discharge passage 104 and a fuel exhaust flow path 74, and a fuel off gas as a hydrogen-containing gas is supplied to the gas liquid separator 36 from the anode flow field 59.

The gas liquid separator 36 separates the fuel off gas into gaseous components and liquid components (water). The gaseous components of the fuel off-gas (fuel exhaust gas) are discharged from the gas discharge hole 152 of the gas-liquid separator 36 and supplied to the suction inlet of the ejector 34 through the circulating flow path 77. On the other hand, while the bleed valve 70 is opened, the fuel off-gas is also supplied to the oxygen-containing gas supply flow path 60B through the connecting flow path (communication flow path) 78 and the bleed valve 70.

The liquid components of the fuel exhaust gas are supplied from the liquid discharge hole 160 of the gas-liquid separator 36 through the drain channel 162 to the merge point MP with the oxygen-containing gas discharge flow path 62. The exhaust passage 99 is also connected to the merge point MP. The oxygen-containing exhaust gas supplied from the oxygen-containing gas discharge flow path 62 and the fuel exhaust gas supplied from the drain channel 162 are discharged from exhaust passage 99 to the outside through the exhaust gas opening 168.

Actually, a part of the fuel off-gas (hydrogen-containing gas) is discharged to the drain channel 162 together with the liquid components. In order to dilute the hydrogen gas in the fuel off-gas before discharging it to the outside, a part of the oxygen-containing gas discharged from the compressor 28 is supplied to the merge point MP through the bypass channel 64.

The bleed valve 70 provided in the connecting flow path 78 connecting the fuel off-gas circulation flow path 77 and the oxygen-containing gas supply flow path 60B is controlled to be opened in accordance with either of the following two control processes.

The first control process is that the bleed valve 70 is opened to prevent deterioration of the anode 57 caused by a decrease in the hydrogen concentration in the anode flow field 59 due to permeation of the nitrogen gas present in the cathode flow field 58 through the membrane electrode assembly 52 during movement of the moving object on which the fuel cell system 10 is mounted (first valve continuous opening control process of the bleed valve 70 during moving).

The second is that the bleed valve 70 is opened to reduce the hydrogen concentration in the exhaust gas discharged from the exhaust gas opening 168 to the outside while the operation state of the fuel cell stack 18 is idling, (second valve continuous opening control process of the bleed valve 70 in the idle state).

When the bleed valve 70 is opened, the fuel off-gas discharged from the fuel cell stack 18 through the fuel exhaust flow path 74 via the gas-liquid separator 36 flows to the cathode flow field 58 through the connecting flow path 78, the oxygen-containing gas supply flow path 60B, and the oxygen-containing gas supply passage 101.

The fuel gas in the fuel off-gas flowing through the cathode flow field 58 is ionized into hydrogen ions by catalytic reactions at the cathode 56, and the hydrogen ions react with the oxygen-containing gas to produce water. The remaining unreacted fuel off-gas (composed of nitrogen gas and a small amount of unreacted hydrogen gas) is discharged from the fuel cell stack 18 as the oxygen-containing off-gas, and flows through the oxygen-containing gas discharge flow path 62.

The oxygen-containing off-gas (including the unreacted remaining fuel off-gas) flowing through the oxygen-containing gas discharge flow path 62 is mixed with the oxygen-containing gas supplied through the bypass channel 64 to dilute the fuel off-gas (including the fuel gas) in the oxygen-containing off-gas to a lower concentration, and the resulting oxygen-containing off-gas flows through the merge point MP.

In the exhaust passage 99 connected to the merge point MP, the fuel gas in the mixed fluid of the liquid water and the fuel off-gas discharged from the drain channel 162 is diluted by the oxygen-containing off-gas from the oxygen-containing gas discharge flow path 62, and is discharged to the outside (atmosphere) through the exhaust gas opening 168.

The opening diameter of the bleed valve 70 is larger than that of the drain valve 164 provided in the drain channel 162. Due to the relationship between the opening diameters, even if the drain valve 164 is stuck in an open state by failure due to freezing or the like, the amount of the fuel off-gas flowing into the connecting flow path 78 becomes larger than the amount of the fuel off-gas flowing into the drain valve 164. As a result, the concentration of the fuel gas discharged from the exhaust gas opening 168 can be reduced.

Figure 2:
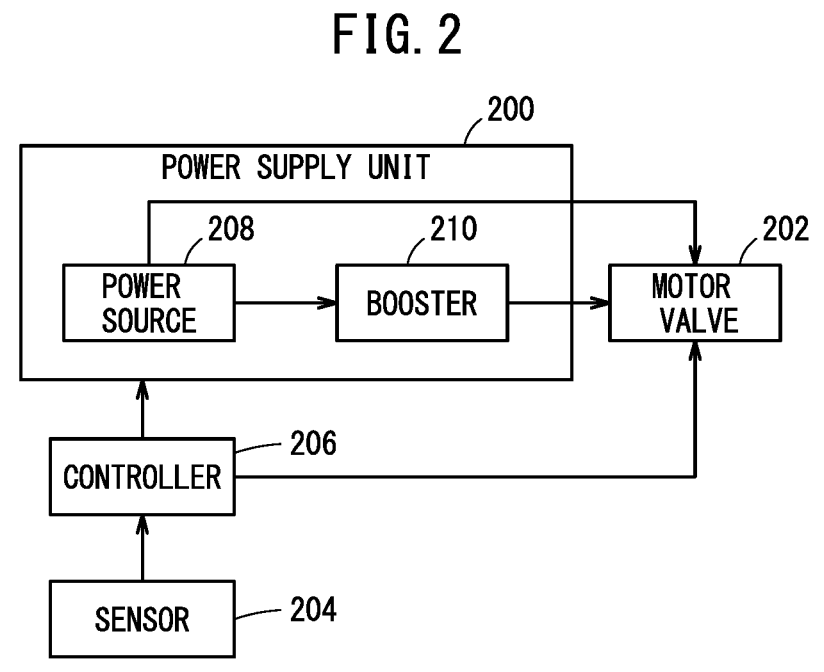

FIG. 2 is a block diagram showing a configuration of a part of the fuel cell system 10. The fuel cell system 10 includes a power supply unit 200, an electric-operated valve 202, a sensor 204, and a controller 206 in addition to the components described above.

The power supply unit 200 outputs one of the first voltage and the second voltage to the electric-operated valve 202 under the control of the controller 206. The second voltage is a voltage higher than the first voltage. The first voltage and the second voltage are DC voltages. The power supply unit 200 includes a power source 208 and a booster 210.

The power source 208 outputs the first voltage to the booster 210. The power source 208 may be a battery that stores electric power generated by the fuel cell stack 18. The booster 210 may be configured by a DC-DC converter or the like. The booster 210 outputs the first voltage or the second voltage to the electric-operated valve 202 in accordance with whether the controller 206 requests an increase voltage or not.

In the case where the controller 206 does not request the increase voltage, the booster 210 outputs the first voltage as supplied from the power source 208 to the electric-operated valve 202 without increasing the voltage. In the case where the controller 206 requests the increased voltage, the booster 210 increases the first voltage supplied from the power source 208 to the second voltage and outputs the second voltage to the electric-operated valve 202. In the case where the booster 210 is a DC-DC converter, the booster 210 outputs the second voltage in accordance with switching control by the controller 206.

In the present embodiment, the electric-operated valve 202 is a supply-side stop valve 118 disposed in the oxygen-containing gas supply flow path 60A. The electric-operated valve 202 includes a valve body and a motor. The valve body is opened or closed by the motor controlled by the controller 206.

The sensor 204 detects an open or closed state of the electric-operated valve 202. The sensor 204 outputs a detection signal indicating that the electric-operated valve 202 is in the open state or the closed state. The sensor 204 may be a flow sensor. The flow sensor measures, for example, a flow rate of the oxygen-containing gas flowing through the oxygen-containing gas supply flow path 60 between the electric-operated valve 202 (supply-side stop valve 118) and the humidifier 30. When the flow rate of the oxygen-containing gas is equal to or higher than a predetermined flow rate threshold value, the flow sensor outputs a detection signal indicating that the electric-operated valve 202 is in the open state to the controller 206. Conversely, when the flow rate of the oxygen-containing gas is less than the predetermined flow rate threshold value, the flow sensor outputs a detection signal indicating that the electric-operated valve 202 is in the closed state to the controller 206.

The controller 206 controls the overall fuel cell system 10. The controller 206 is configured by a computer including one or more processors (CPUs), a memory, an input/output interface, and an electronic circuit. The one or more processors (CPUs) execute a program (not illustrated) stored in the memory.

The processor (CPU) of the controller 206 performs operation control of the fuel cell system 10 by executing calculation in accordance with the program.

That is, upon receiving a command to start power generation of the fuel cell stack 18, the controller 206 opens a shut-off valve of the hydrogen tank 20 to supply the fuel gas to the fuel cell stack 18. Thereafter, at the timing of activating the electric-operated valve 202 (supply-side stop valve 118), the controller 206 executes valve control processing for controlling the electric-operated valve 202.

FIG. 3 is a flowchart showing a procedure of valve control processing.

In step S1, the controller 206 executes the valve drive operation (the first valve drive operation or the second valve drive operation) for driving the electric-operated valve 202. Immediately after the timing of activating the electric-operated valve 202, the controller 206 executes the first valve drive operation. In this case, the controller 206 starts outputting the valve-opening command to the electric-operated valve 202 without outputting a request for an increased voltage to the booster 210. That is, the controller 206 causes the power supply unit 200 to output the first voltage to drive the electric-operated valve 202 to open, and proceeds to step S2.

In step S2, the controller 206 checks the status of the electric-operated valve 202 based on the detection signal output from the sensor 204 after a predetermined period of time has elapsed since the valve-opening command was output to the electric-operated valve 202.

Here, in the case of the detection signal indicating an open state of the electric-operated valve 202, the controller 206 terminates the valve control processing. In this case, the controller 206 causes the fuel cell stack 18 to perform the power generation operation while maintaining the electric-operated valve 202 in the open state. That is, the controller 206 supplies electromotive power to the compressor 28 to energize the compressor 28. In this case, the controller 206 controls the discharge-side stop valve 120 to be in the open state. The controller 206 determines a target power generation amount based on at least one of the temperature, the voltage, and the power of the fuel cell stack 18, and adjusts the opening degree of the bypass valve 122 in accordance with the target power generation amount. Further, the controller 206 switches the drain valve 164 to either an open state or a closed state based on a water level sensor or the like in the gas-liquid separator 36 to keep the amount of the liquid component constant inside the gas-liquid separator 36.

On the other hand, in the case of the detection signal indicating a closed state of the electric-operated valve 202, the controller 206 stops outputting the valve-opening command to the electric-operated valve 202. Thereafter, the controller 206 proceeds to step S3.

In step 1, the valve drive operation is performed, and in step S3, the controller 206 determines whether or not the valve drive operation has been executed a predetermined number of times, which is more than the single valve drive operation performed in step 1, i.e., two or more times. Until the valve drive operation has been executed the predetermined number of times, the controller 206 returns to step S1. On the other hand, after the valve drive operation has been performed the predetermined number of times, the controller 206 proceeds to step S4.

In step S4, the controller 206 determines whether or not the second valve drive operation has been executed. When the second valve drive operation has not been executed, the controller 206 proceeds to step S5 to start outputting a request for an increased voltage to the booster 210, and then returns to step S1. In this case, in step S1, the controller 206 executes the second valve drive operation. That is, the controller 206 causes the power supply unit 200 to output the second voltage to drive the electric-operated valve 202 to open.

On the other hand, when the second valve drive operation has been executed, the controller 206 proceeds to step S6, stops the output of the voltage (the first voltage or the second voltage) to the electric-operated valve 202, and then terminates the valve control processing. In this case, the controller 206 stops the power generation operation of the fuel cell stack 18. That is, the controller 206 closes the shut-off valve of the hydrogen tank 20 to stop the supply of the fuel gas to the fuel cell stack 18.

In this way, the controller 206 executes the first valve drive operation a predetermined number of times until the electric-operated valve 202 is brought into the open state. In a case where the electric-operated valve 202 is still in the closed state even after the first valve drive operation has been executed the predetermined number of times, the controller 206 executes the second valve drive operation the predetermined number of times until the electric-operated valve 202 is brought into the open state.

Figure 4:
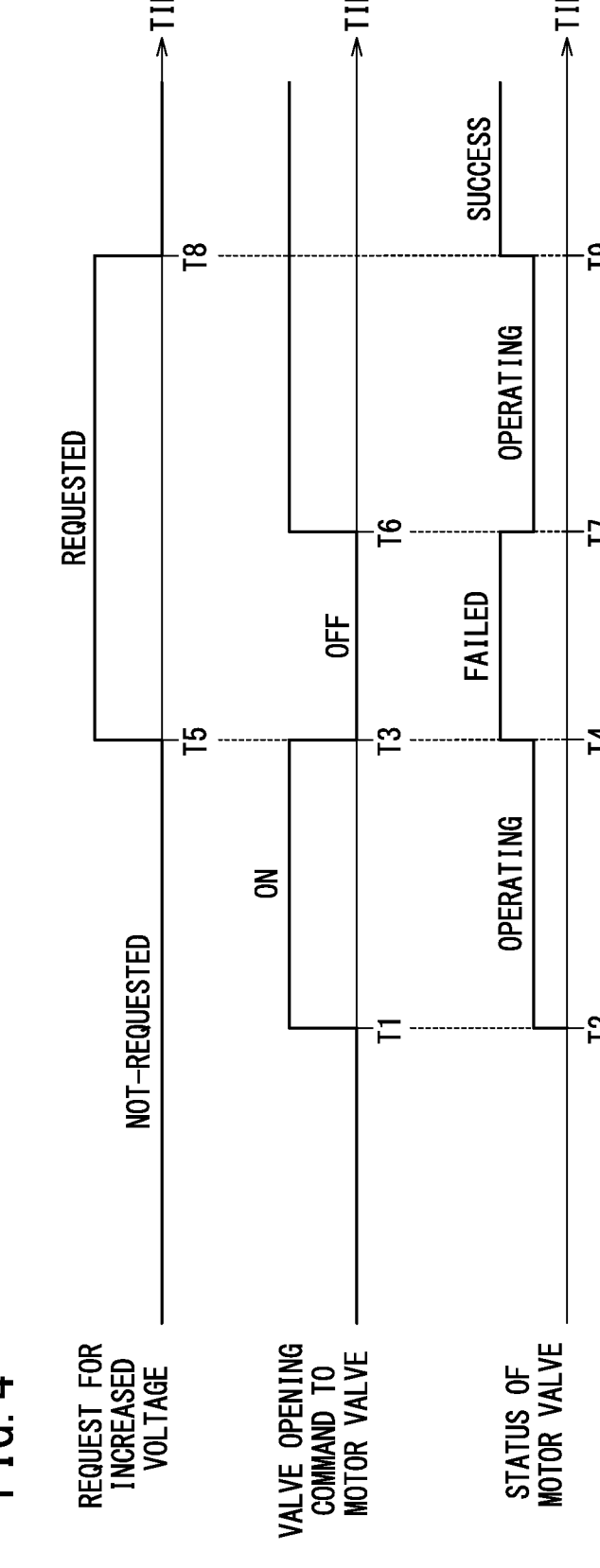
FIG. 4 is a timing chart showing operation timings of a controller that executes the valve control processing.

FIG. 4 is a timing chart showing operation timings of the controller 206 that executes the valve control processing. FIG. 4 shows an example in which the valve drive operation is executed once. FIG. 4 illustrates an example in which the electric-operated valve 202 is not brought into the open state by the first valve drive operation and the electric-operated valve 202 is brought into the open state by the second valve drive operation.

After starting the valve control processing, the controller 206 starts outputting the valve-opening command to the electric-operated valve 202 without outputting a request for an increased voltage to the booster 210 (FIG. 4: T1). In this case, the controller 206 sets a status signal to "operating" at the timing at which the valve-opening command is output to the electric-operated valve 202 (FIG. 4: T2). The status signal is a signal indicating the status of the electric-operated valve 202.

When the electric-operated valve 202 is not detected to be in the open state even after a predetermined output maintaining period has elapsed from the start of the output of the valve-opening command to the electric-operated valve 202, the controller 206 stops the output of the valve-opening command to the electric-operated valve 202 (FIG. 4: T3). In this case, the controller 206 changes the status signal from "operating" to "failed" at the timing when the output of the valve-opening command to the electric-operated valve 202 is stopped (FIG. 4: T4). In addition, the controller 206 outputs a request for an increased voltage to the booster 210 at the timing when the output of the valve-opening command to the electric-operated valve 202 is stopped (FIG. 4: T5).

When a predetermined output-stop period elapses after the output of the valve-opening command to the electric-operated valve 202 is stopped, the controller 206 restarts the output of the valve-opening command to the electric-operated valve 202 (FIG. 4: T6). In this case, the controller 206 changes the status signal from "failed" to "operating" at the timing when the output of the valve-opening command is started again (FIG. 4: T7).

Thereafter, when it is detected that the electric-operated valve 202 is in the open state, the controller 206 stops outputting the request for the increased voltage to the booster 210 (FIG. 4: T8). In this case, the controller 206 changes the status signal from "operating" to "success" at the timing when the output of the request for the increased voltage to the booster 210 is stopped (FIG. 4: T9).

In this way, the controller 206 executes the first valve drive operation to open the electric-operated valve 202 by causing the power supply unit 200 to output the first voltage. In a case where the electric-operated valve 202 is in the closed state even when the first valve drive operation is executed, the controller 206 executes the second valve drive operation to open the electric-operated valve 202 by causing the power supply unit 200 to output the second voltage higher than the first voltage.

In this way, it is possible to suppress acceleration of degradation of the power supply unit 200 and to reduce power consumption by the electric-operated valve 202 as compared to a case where the first valve drive operation is not performed. Further, by performing the second valve drive operation, even if the electric-operated valve 202 is in a relatively deep frozen state, it is possible to release the frozen state.

The present invention is not particularly limited to the above-described embodiments, and various modifications can be made thereto within a range that does not deviate from the essence and gist of the present invention.

For example, the controller 206 may determine whether or not the electric-operated valve 202 is frozen based on the temperature sensor 73. For example, when the outside air temperature exceeds a predetermined temperature threshold value, the controller 206 determines that the electric-operated valve 202 is not frozen. In this case, as described above in the embodiment, the controller 206 executes the second valve drive operation after executing the first valve drive operation. On the other hand, when the outside air temperature is equal to or lower than the predetermined temperature threshold value, the controller 206 determines that the electric-operated valve 202 is frozen. In this case, the controller 206 may execute the second valve drive operation without executing the first valve drive operation.

Next, the invention and effects understood from the above embodiment and modifications will be described below. It should be noted that, for ease of understanding, some of constituent elements are labelled with the reference numerals of those used in the embodiment and modifications, but the present invention is not limited to such constituent elements labelled with the reference numerals.

(1) The fuel cell system (10) according to the present invention comprising: the fuel cell stack (18) configured to generate power by electrochemical reactions between the fuel gas and the oxygen-containing gas; the oxygen-containing gas supply flow path (60) configured to supply the oxygen-containing gas to the fuel cell stack; the electric-operated valve (202 (118)) disposed on the oxygen-containing gas supply flow path; the power supply unit (200) configured to output to the electric-operated valve one of the first voltage and the second voltage higher than the first voltage; the sensor (204) configured to detect an open or closed state of the electric-operated valve; and the controller (206) configured to control the power supply unit, wherein the controller executes the first valve drive operation by causing the power supply unit to output the first voltage to drive the electric-operated valve to open at the time of starting power generation by the fuel cell stack, and executes a second valve drive operation by causing the power supply unit to output the second voltage to drive the electric-operated valve to open in the case where the electric-operated valve is in the closed state even after execution of the first valve drive operation.

In this way, it is possible to suppress acceleration of degradation of the power supply unit and to reduce power consumption by the electric-operated valve as compared to a case where the first valve drive operation is not performed. Further, by performing the second valve drive operation, even if the electric-operated valve is in a relatively deep frozen state, it is possible to release the frozen state. As a result, the frozen state can be released while suppressing acceleration of degradation of the power supply.

(2) In the fuel cell system according to the present invention, the controller may execute the first valve drive operation a predetermined number of times until the electric-operated valve is brought into the open state, and execute the second valve drive operation in the case where the electric-operated valve is in the closed state even after the first valve drive operation is executed the predetermined number of times. Thus, compared to a case where the first valve drive operation is not performed the predetermined number of times, there is a possibility that the frozen state of the electric-operated valve can be released without performing the second valve drive operation.

(3) In the fuel cell system according to the present invention, the controller may execute the second valve drive operation a predetermined number of times until the electric-operated valve is brought into the open state. This increases the possibility that the frozen state of the electric-operated valve can be released compared to the case where the second valve drive operation is not executed the predetermined number of times.

(4) In the fuel cell system according to the present invention, the controller may be configured to stop power generation by the fuel cell stack in the case where the electric-operated valve is in the closed state even after the second valve drive operation is executed. In this manner, it is possible to prevent the fuel cell stack from generating power in a state where the oxygen-containing gas is not supplied to the fuel cell stack via the oxygen-containing gas supply flow path due to the closed state of the electric-operated valve, and as a result, it is possible to reliably maintain safety.

The invention claimed is:
1. A fuel cell system comprising:
a fuel cell stack configured to generate power by electrochemical reactions between a fuel gas and an oxygen-containing gas;
an oxygen-containing gas supply flow path configured to supply the oxygen-containing gas to the fuel cell stack;
an electric-operated valve disposed on the oxygen-containing gas supply flow path;
a power supply unit configured to output to the electric-operated valve one of a first voltage and a second voltage higher than the first voltage;
a sensor configured to detect an open or closed state of the electric-operated valve; and
a controller configured to control the power supply unit, wherein the controller executes a first valve drive operation a predetermined number of times to bring the electric-operated valve into the open state by causing the power supply unit to output the first voltage to drive the electric-operated valve to open at a time of starting power generation by the fuel cell stack, and executes a second valve drive operation by causing the power supply unit to output the second voltage to drive the electric-operated valve to open in a case where the electric-operated valve is in a closed state even after the first valve drive operation is executed the predetermined number of times.
2. The fuel cell system according to claim 1, wherein the controller executes the second valve drive operation a predetermined number of times until the electric-operated valve is brought into the open state.
3. The fuel cell system according to claim 1, wherein the controller is configured to stop power generation by the fuel cell stack in a case where the electric-operated valve is in the closed state even after the second valve drive operation is executed.

4. The fuel cell system according to claim 1, wherein the predetermined number of times is two or more.

\* \* \* \* \*